US011323315B1

(12) United States Patent
Leung et al.

(10) Patent No.: US 11,323,315 B1
(45) Date of Patent: May 3, 2022

(54) AUTOMATED HOST MANAGEMENT SERVICE

(71) Applicant: Amazon Technologies, Inc., Reno, NV (US)

(72) Inventors: Ian Man Hin Leung, Seattle, WA (US); Rachit Jain, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 771 days.

(21) Appl. No.: 15/826,312

(22) Filed: Nov. 29, 2017

(51) Int. Cl.
*H04L 12/14* (2006.01)
*H04L 41/0803* (2022.01)
*H04L 47/70* (2022.01)
*H04L 41/06* (2022.01)
*H04L 43/10* (2022.01)
G06F 8/61 (2018.01)

(52) U.S. Cl.
CPC .......... *H04L 41/0803* (2013.01); *H04L 41/06* (2013.01); *H04L 43/10* (2013.01); *H04L 47/82* (2013.01); *G06F 8/61* (2013.01)

(58) Field of Classification Search
CPC ..... H04L 41/0803; H04L 41/06; H04L 43/10; H04L 47/82; G06F 8/61
See application file for complete search history.

(56) References Cited

U.S. PATENT DOCUMENTS

| | | | | |
|---|---|---|---|---|
| 7,685,109 | B1* | 3/2010 | Ransil | G06F 9/5083 707/999.003 |
| 8,924,542 | B1* | 12/2014 | Gabrielson | H04L 12/6418 709/224 |
| 9,652,326 | B1* | 5/2017 | Bauer | G06F 11/203 |
| 2002/0091805 | A1* | 7/2002 | Phillips | G06F 9/4406 709/220 |
| 2002/0091854 | A1* | 7/2002 | Smith | G06F 9/5061 709/236 |
| 2004/0255110 | A1* | 12/2004 | Zimmer | G06F 9/4405 713/2 |
| 2007/0234293 | A1* | 10/2007 | Noller | G06F 11/3688 717/124 |
| 2008/0205377 | A1* | 8/2008 | Chao | H04L 69/40 370/351 |
| 2009/0300606 | A1* | 12/2009 | Miller | G06F 9/45558 718/1 |

(Continued)

OTHER PUBLICATIONS

Mogull, et al.: Security Guidance for Critical Areas of Focus in Cloud Computing v4.0, dated Jul. 26, 2017.

*Primary Examiner* — Oanh Duong
(74) *Attorney, Agent, or Firm* — Hogan Lovells US LLP

(57) ABSTRACT

A recovery workflow is part of an automated management service for bare metal hosts allocated for single-tenant operation in a multi-tenant environment. The health of the hosts is monitored using a set of health criteria. If it is detected that one of the host machines fails a health check then a host recovery workflow can be initiated. As part of the workflow, the failed host can be repurposed or retired. A spare host class can be used to obtain a new host to take over for the failed host. Once deployed, the operation of the new host can be tested. Upon passing the test, the new host can take over for the failed host. A new host resource can be automatically requested to be added to the spare host class in order to ensure that there are sufficient resources available in case of an additional failure.

20 Claims, 5 Drawing Sheets

(56) References Cited

U.S. PATENT DOCUMENTS

| | | | |
|---|---|---|---|
| 2010/0235807 A1* | 9/2010 | Doddappa | G06F 11/3664 717/101 |
| 2012/0072581 A1* | 3/2012 | Tung | H04L 67/1008 709/224 |
| 2014/0122670 A1* | 5/2014 | Levy | H04L 41/0893 709/220 |
| 2014/0208317 A1* | 7/2014 | Nakagawa | G06F 9/45533 718/1 |
| 2014/0244585 A1* | 8/2014 | Sivasubramanian | G06F 16/21 707/639 |
| 2014/0309815 A1* | 10/2014 | Ricci | G01C 21/3697 701/2 |
| 2014/0372513 A1* | 12/2014 | Jones | G06F 9/5072 709/203 |
| 2015/0227426 A1* | 8/2015 | Andrade Costa | G06F 11/1415 714/47.3 |
| 2016/0204923 A1* | 7/2016 | Ashok | G06F 9/45558 709/226 |
| 2016/0359675 A1* | 12/2016 | Chen | H04L 43/08 |
| 2017/0054617 A1* | 2/2017 | Cropper | H04L 67/1025 |
| 2017/0214738 A1* | 7/2017 | Agarwal | H04L 47/125 |
| 2017/0235686 A1* | 8/2017 | Chandra | G06F 13/4068 710/104 |
| 2018/0039678 A1* | 2/2018 | de Lavarene | H04L 67/42 |
| 2018/0101374 A1* | 4/2018 | Chittigala | G06F 11/2028 |
| 2019/0068476 A1* | 2/2019 | Ranjit | H04L 43/08 |
| 2019/0086911 A1* | 3/2019 | Xin | G05B 23/0251 |
| 2019/0129729 A1* | 5/2019 | Peterkofsky | G06F 9/5072 |

* cited by examiner

AUTOMATED HOST MANAGEMENT SERVICE

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In various resource provider environments, however, there will be hosts that are not to be accessed by other customers. These may be bare metal resources, where the entire machine is dedicated to a specific entity, either the provider or otherwise, as the resource may store secrets or provide sensitive functionality that is not to be shared or exposed to external entities. Conventional approaches to detecting and replacing bad bare metal hosts are performed through manual intervention. Such an approach also typically requires a technician diagnosing a problem to order new hardware, which can take a significant amount of time in many cases.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access and actions with respect to data and resources in an electronic environment. In particular, various embodiments provide for the automated management of single tenant host operation in a multi-tenant environment. There may be sensitive operations that are to be performed using single-tenant, bare metal resources. These hosts can be monitored to ensure that the hosts are healthy and functioning properly. A set of health criteria can be provided for the monitoring, and if it is detected that one of the host machines fails a health check based at least in part upon one of these criteria, then a host recovery workflow can be initiated. As part of the workflow, the failed or problematic host can be repurposed or retired. A spare host class can be used to obtain a new host for the allocation, and that new host can be configured to take over for the failed host. Once deployed, the operation of the new host can be tested. If the new host passes the test, the new host can take over for the failed host as part of the allocation. A new host can be automatically requested, as part of the workflow, to be added to the spare host class in order to ensure that there are sufficient resources available in case of an additional failure of one or more of the allocated bare metal resources. The customer receiving the allocation can provide basic configuration information such as a host definition and the health criteria, and the management and recovery of the hosts can be performed automatically based on that information.

Various other such functions can be used as well within the scope of the various embodiments as would be apparent to one of ordinary skill in the art in light of the teachings and suggestions contained herein.

Figure 1:
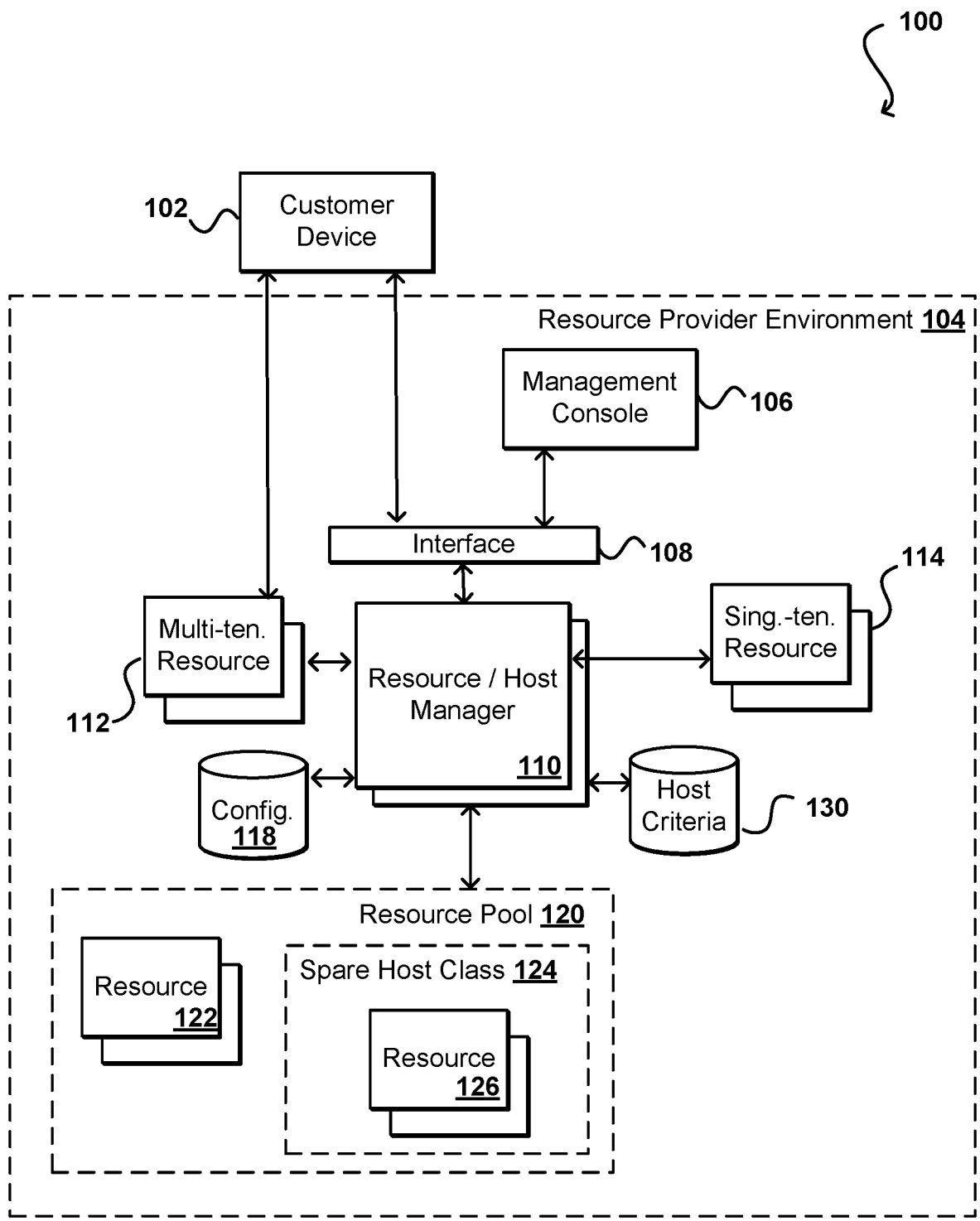
FIG. 1 illustrates components of an example system for managing single tenant hosts that can be utilized in accordance with various embodiments.

FIG. 1 illustrates an example system 100 that can be utilized to implement aspects of the various embodiments. In this example, a customer can establish an account with a resource provider, whereby the customer can gain access to a pool 120 of resources offered by the provider through a resource provider environment 104. The resources can be any appropriate physical and/or virtual resources capable of receiving, storing, transmitting, and/or processing electronic data and/or instructions as discussed elsewhere herein. In many examples, the resources will include computer servers or host machines that can be allocated to one or more customers for processing instructions on behalf of those customers. A customer can utilize a customer device 102 to submit requests to be received by an interface of an interface layer 108, where the interface layer can include various interfaces, routers, load balancers, and other externally-facing components as discussed elsewhere herein. A request for a resource can be received to a resource manager 110, which can cause a resource 122 from a resource pool 120 of available resource capacity to be allocated to that customer. The customer can then use the client device 102 to communicate with the allocated resource 112.

As mentioned, the resources provided through the resource environment can include various multi-tenant resources 112, where those resources can be concurrently allocated to multiple customers. This can include, for example, allocating different portions of the resource to different customers, such as may involve the allocation of multiple data volumes or virtual machines executing on a single host machine. It might be the case, however, that a resource may need to store sensitive information, such as credentials, keys, personal information, and the like, that is to be shielded from access by other customers or entities. While the data volumes, virtual machines, and other portions or divisions of a host machine will be secured, exposing these machines to outside entities leaves them vulnerable to hacking. Thus, some of the resources 122 from the resource pool 120 can be allocated as single tenant resources 114 that are not exposed to multiple entities, but where the entirety of the resource is allocated to a single entity. This entity may be the provider itself, or a dedicated customer. If the single tenant resource is allocated to a customer, the resource provider itself may not have access to the single tenant resource, or may have limited access.

Pulling resources 122 from a general resource pool can still be potentially problematic. The resources in general may have previously been allocated to one or more customers or other entities, and thus may have some amount of malicious code installed unless the resources are completed wiped and reconfigured after each use. Further, the requirements for single tenant bare metal hosts may be different from those for other purposes. Thus, single tenant resources in conventional systems are typically manually configured and not taken from the resource pool. In the event of a failure of one of these single-tenant, bare metal hosts, a technician or engineer typically must obtain and configure new hardware to replace the failed host, and then order a replacement machine to function as an extra. The process typically involves cutting a service ticket, having a technician verify that the host is bad, removing the host from the sensitive service or other allocation, selecting and configuring a replacement host, confirming that the new host is functioning properly, then issuing a request for a new spare host. This process includes many complex steps, and in the event that a human error occurs and a step is missed or performed incorrectly or incompletely, the impact to a sensitive service could be huge. An example of this is that many engineers forget to issue requests for new hardware, resulting in not enough hardware being available when bad hosts are discovered, thus impacting the service performance and availability.

Accordingly, approaches in accordance with various embodiments can automatically monitor the state of these host machines, as well as other such resources, and automate the replacement of failed (or otherwise problematic) hosts. In some embodiments, a spare host class 124 is maintained, from which new host machines can be allocated. The allocated hosts can be considered part of a primary host class in some embodiments. There can be one or more failure criteria specified for a particular host allocation, such as may relate to an operational state of an allocated host. In at least some embodiments the customer and/or provider can specify various threshold specifications for health checks and alerts as input parameters. A component such as a resource manager can then periodically communicate with the single tenant resources 114 and utilize these host criteria stored in a corresponding criteria repository 130 to identify a host that satisfied one or more of these failure criteria (or fails to satisfy a healthy host criterion, etc.). In some embodiments the health check might be a simple ping to an identified process of a host 114, while in other embodiments various operational state parameters (e.g., availability, available capacity, performance metrics, etc.) may be compared against the host criteria, among other such options. The resource manager, once identifying a bad host, can cause that host to be removed from the allocation. The resource manager in this example may directly, or in conjunction with a pool manager, identify a spare resource 126 that can be selected to replace the failed host. In order to ensure that the resource has not been compromised and is able to provide the necessary security, the resource can be selected from a respective spare host class 124 in the resource pool 120. The resource manager, or another such component or service, can configure the new host and perform any appropriate testing of the host before allocating the host for the customer (or other entity) to replace the failed host in its respective operation. Configuring the new host in some embodiments can also involve loading the appropriate software and storing information or content to cause the new host to be in a same or similar state to that of the failed host at a time just prior to the failure. The resource manager can then utilize the relevant configuration data 118 to request and/or obtain new hardware to function as an available resource 126 in the spare host class 124.

In such an example, the process is automated such that no human intervention will be needed in most cases. A customer or entity for whom the resources are to be allocated can simply provide the relevant information, through a customer device 102, management console 106, API, or other appropriate interface, and the components of the management service can be responsible for the monitoring and management of the resources. As part of an example allocation setup process, a customer or entity can provide the relevant configuration information, such as the service that is running and the relevant set of hosts. The information can also identify the spare host class to be used to obtain the hosts. In some embodiments the information can also identify a source for obtaining additional host machines for the spare host class as part of a host ordering pipeline.

As mentioned, in some embodiments the single-tenant resources 114 can be "special" host computers or devices that are used to run sensitive services, or perform sensitive functionality, as may relate to security or other such operations. The hosts would not be the same as the hosts offered to external customers, for example, but can be bare metal hosts wherein there is no virtualization and the entity to whom the host is allocated will have access to all components of the machine, including the operating system, etc. In some bare metal servers, the virtual machine is installed directly on the hardware rather than within the operating system (OS). The virtual machine in this case would then not function as a multi-tenant shared resource OS providing multiple customers with the impression of control over the entire computing device, but would instead provide a single tenant with actual control over the entire computing device in most instances.

In some embodiments a customer may have an allocation of these single-tenant hosts that do nothing other than run customer code. In such an implementation, the resource manager 120, or other component(s) of a host management service, can automate the entire failure detection and recovery process. In some embodiments, the resource manager 110 can periodically ping, or send requests, to the various host machines 114, or processes executing on those machines. As long as a timely response is received, it can be determined that the hosts are operating appropriately. If a response is not timely received, or a specified number of sequential responses are not received, it can be determined in some embodiments that the host is in a failure state. In this example, the determination that a host is in a failure state can trigger or initiate a host replacement workflow. As mentioned, other approaches for determining a failure state can be used as well, such as may involve one or more deep health checks to determine whether the host can accept and process requests, and provide accurate results.

As part of the replacement workflow, the failed host can be repurposed or replaced using a resource from a spare host class. In some embodiments an API can be called to execute the retirement and repurposing workflow. As mentioned, this can involve identifying and configuring the new host machine, as well as removing the failed host from the allocation and performing any relevant retirement or repurposing actions for that host. Any domains, communication channels, or addresses can be disassociated from the failed host. Once the new host is configured the host can be deployed and tested, to ensure that the host is operating correctly. New hardware can then be automatically requested to ensure sufficient capacity in the spare host class 124. Conventional approaches do not provide such an automated process, and processes discuss herein can improve the operation of the computer system at least by the fact that failed hosts can automatically be replaced more quickly, and it can be ensured that sufficient capacity is available in the event of a failed host, among other performance advantages. Such approaches also significantly reduce the operational load on various teams that support the resource environment.

In some embodiments, the detection of a bad host or determination of host state can be made based on values, criteria, parameters, or script provided by a customer or other relevant entity. For example, a customer can indicate a ping frequency to be used, an amount of time to wait for a response to each ping, and a number of ping responses to miss before a host is determined to be in a failure state. Another approach could be to look at the most recent timestamp generated by a process executing on the host, and if the timestamp is older than a maximum threshold (with respect to the current time) then the host can be determined to be in a failure state or unhealthy state, etc. There can also be various criteria or values set with respect to performance that can be used to determine a healthy state of operation of the host as discussed elsewhere herein.

In some embodiments a customer can provide a script to be executed to determine whether the host has an expected operational state. The script can be executed on the host itself, or on a resource manager in communication with the host, among other such options. In some embodiments the script is executed on each host for an allocation, and a determination can be made as to whether the results are consistent across the hosts or whether the results deviate for one or more hosts. An extent or type of deviation can be used to infer the health of that particular host machine.

A customer or entity can also provide a definition for these special hosts. For example, a special host might be used to store the private keys or master keys to perform certain verification actions. The definitions may then include specific configurations and requirements needed to perform those operations, as well as to maintain the appropriate level of security. The definition may also include the type of access permissible by various entities, and can indicate that some or all functionality is restricted from access by other parties. The definition in some embodiments can also specify whether the hosts are to have external connectivity beyond the resource provider environment, or even a logically segregated zone within that environment. The spare host class can also be defined and configured to only store hosts meeting this definition and available for this particular purpose.

Figure 2:
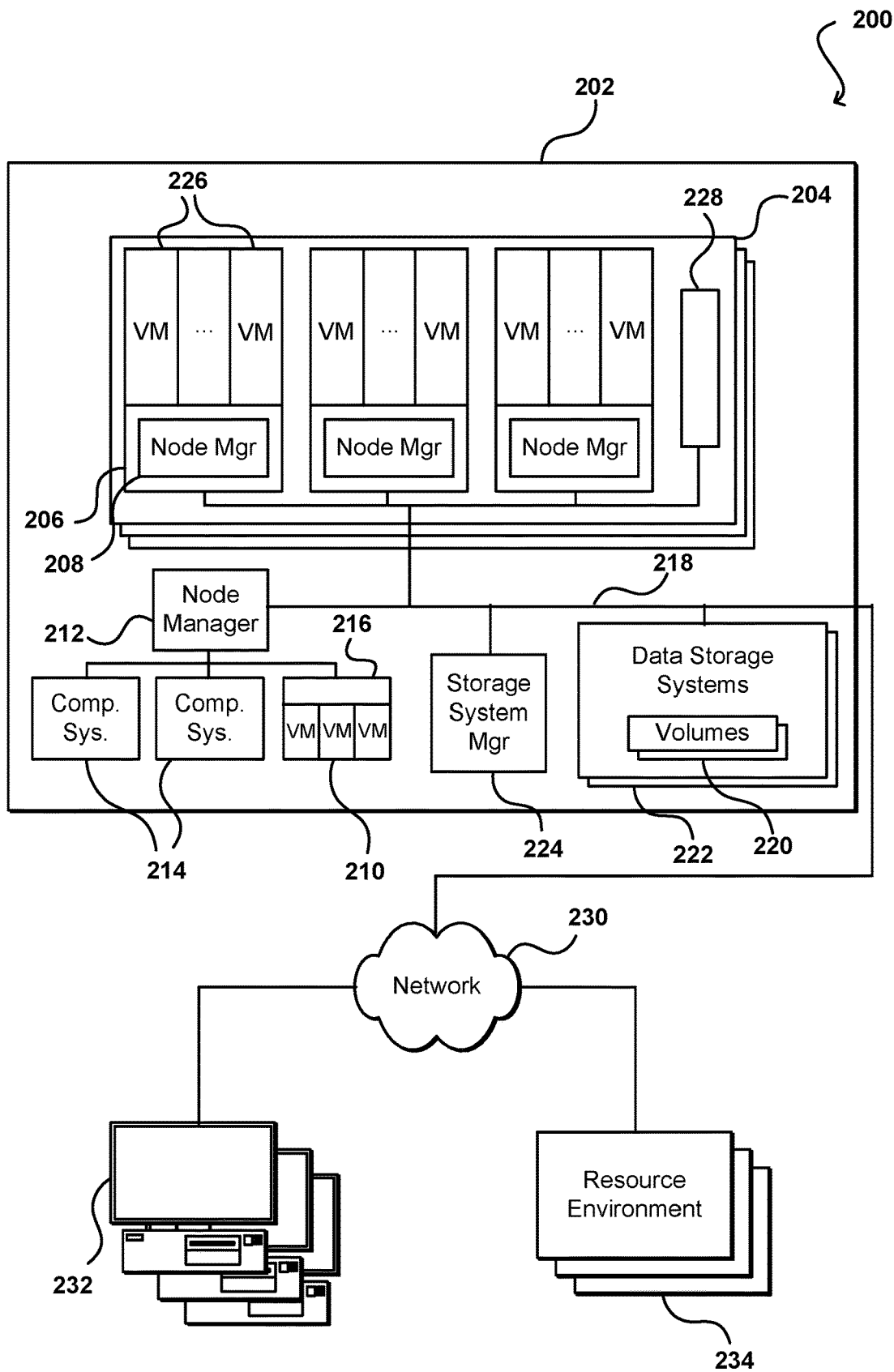
FIG. 2 illustrates an example environment in which various embodiments can be implemented.

FIG. 2 illustrates an example environment 200 in which aspects of the various embodiments can be implemented. This environment includes various types of resources that can be allocated, monitored, and managed within the scope of the various embodiments. This configuration can include components offered as part of a multi-tenant environment, or resource provider environment 202, wherein the components are provided by a resource provider, and customers pay for access and/or utilization of respective portions of those resources. In this example configuration, the resource provider environment includes a number of racks 204, each rack including a number of host computing devices 206. The host computing systems 206 each host one or more virtual machines. Each virtual machine can act as an independent resource node for executing one or more program copies or performing another such action or process for user data requests, I/O operations, etc. This example configuration also includes computer systems that execute a data storage system or service. The service can utilize a pool of multiple data storage systems, which each have local storage for use in storing one or more volumes 210. Access to the volume copies 210 is provided over an internal network to programs executing on various resource nodes. Thus, an application executing on a virtual machine instance on one of the computer systems 206 can be connected with one or more storage volumes 210 in the data storage systems. This is referred to herein as the instance being "attached" to the storage volume(s). In this example configuration, multiple computing systems are operable to execute various programs, applications, and/or services, and further operable to access reliable data storage, such as under the control of a data storage service. A data storage service can use multiple data storage systems in a data center to provide reliable, non-local, data storage to executing programs or various other components, systems, or services. Multiple remote archival storage systems external to the data center may also be used to store additional copies of at least some portions of at least some data storage volumes.

In this example, a data center 202 includes a number of racks 204, each rack including a number of host computing devices 206, as well as an optional rack support computing system 228 in this example embodiment. The host computing systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing systems, such as in a manner similar to the node manager modules 208 for the host computing systems 206. The rack support computing system 228 may provide various utility services for other computing systems local to its rack 204 (e.g., long-term program storage, metering, and other monitoring of program execution and/or of non-local data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 202 also includes a computing system 224 that executes a data storage system manager module for the data storage service (e.g., a block-based data storage service) to assist in managing the availability of non-local data storage to programs executing on resource nodes provided by the host computing systems located within the data center (or optionally on computing systems located in one or more other data centers 234, or other remote computing systems 232 external to the data center). In particular, in this example the data center 202 includes a pool of multiple data storage systems 222, which each have local storage for use in storing one or more volume copies 220. Access to the volume copies 220 is provided over the internal network(s) 218 to programs executing on various resource nodes 210 and 214. As discussed in greater detail elsewhere, a data storage system manager module 224 may provide a variety of services related to providing non-local data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the data storage system manager module 222 may coordinate with the node manager modules 212, 208 to manage use of volumes by programs executing on associated resource nodes, while in other embodiments the node manager modules may not be used to manage such volume use. In addition, in other embodiments, one or more data storage system manager modules 224 may be structured in other manners, such as to have multiple instances of the data storage system manager executing in a single data center (e.g., to share the management of non-local data storage by programs executing on the resource nodes provided by the host computing systems located within the data center), and/or such as to have at least some of the functionality of a data storage system manager module being provided in a distributed manner by software executing on some or all of the server data storage systems 222 (e.g., in a peer-to-peer manner, without any separate centralized data storage system manager module on a computing system 224).

In this example, the various host computing systems, server data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems 222 may further be interconnected with one or more other networks or other connection mediums, such as a high-bandwidth connection over which the storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server data storage systems, depending on the number of server storage systems, size of the volumes, and number of mirror copies per volume. It will be appreciated that in other embodiments, other numbers of computing systems, programs and volumes may be used.

Figure 3:
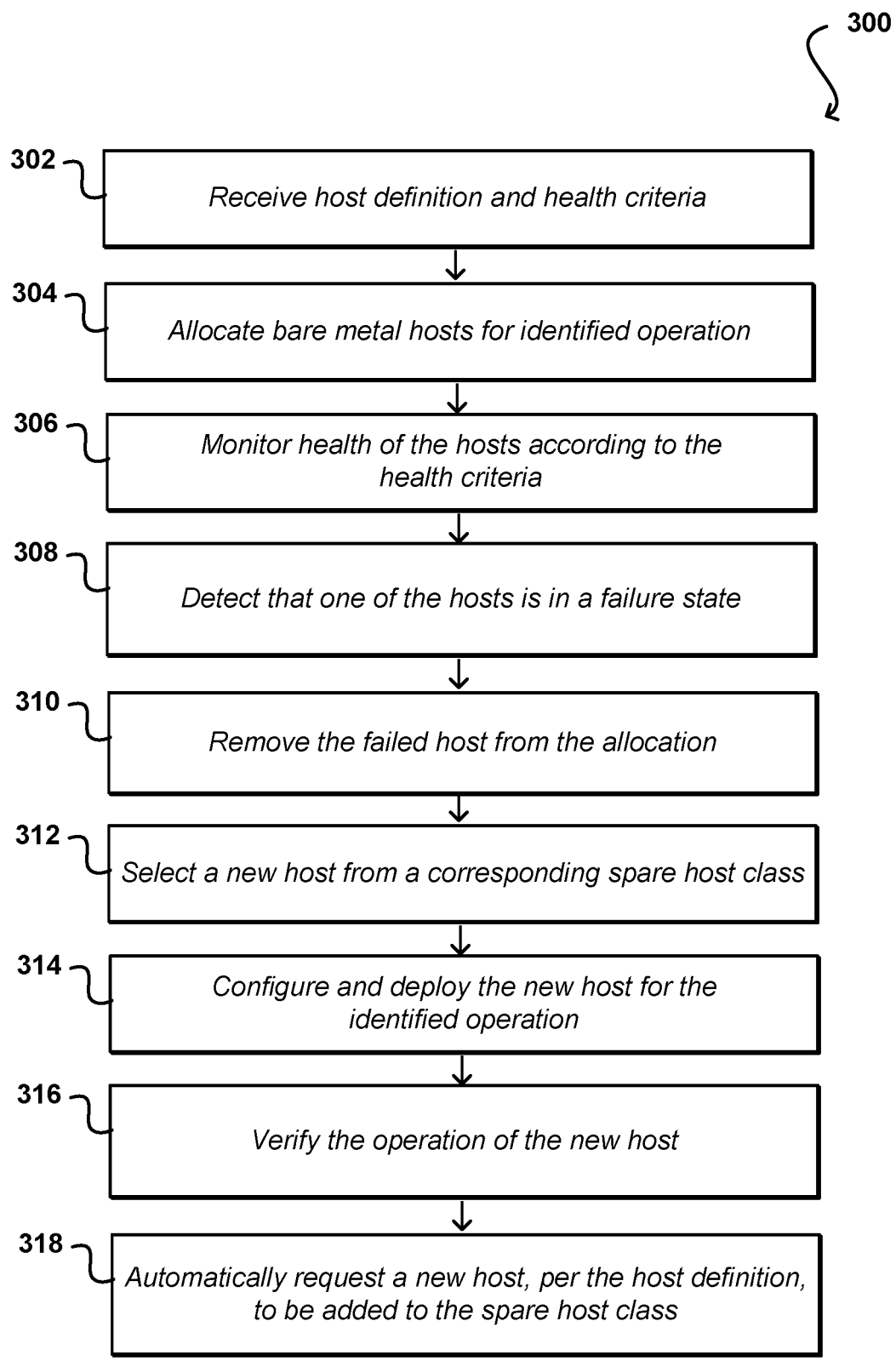
FIG. 3 illustrates an example process for managing host resources that can be utilized in accordance with various embodiments.

FIG. 3 illustrates an example process 300 for managing bare metal hosts that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, a customer or other entity is to have a set of bare metal host machines allocated for only single tenant occupancy by that customer. In a configuration stage, a host definition is received 302 that is to be used to provide the host machines, as well as one or more health criteria that are used to determine an operational state or healthy state of each host. Various other information can be received as well, such as a spare host class identifier or host source, among other such options. Once the appropriate information is obtained, the bare metal hosts can be allocated 304 for the identified operation on behalf of the customer. During the same or a different operation, one or more hosts can also be configured or allocated to the spare host class. During execution of the identified operation by the hosts, the health can be monitored 306 according to the provided health criteria. As mentioned, in some embodiments the criteria might be as simple as receiving a response to a ping or receiving a heartbeat communication, while in other embodiments the criteria can include a set of health values that must be provided by the host and be within specified ranges of values, among other such options.

During the monitoring, it can be detected 308 that one of the hosts is in a failure state, unhealthy state, or other state of abnormal operation. This determination can be made based on one of the host values failing a health criterion or satisfying a failure criterion, among other such options. The failed host in this example can be removed 310 or retired from the allocation. A new host can then be selected 312 from the corresponding spare host class. The new host can be configured 314, if not already configured as part of the spare host class, and deployed for the identified operation. The operation of the new host can be tested and verified 316 before the new host is able to assume the role of the failed host before the failure. An analysis of the spare host class can be performed in some embodiments, and if there is less than a minimum or specified amount of capacity in the spare host class, a new host resource can be automatically requested 318 to be added to the host class, where the new host machine is to be provided according to the respective host definition.

Figure 4:
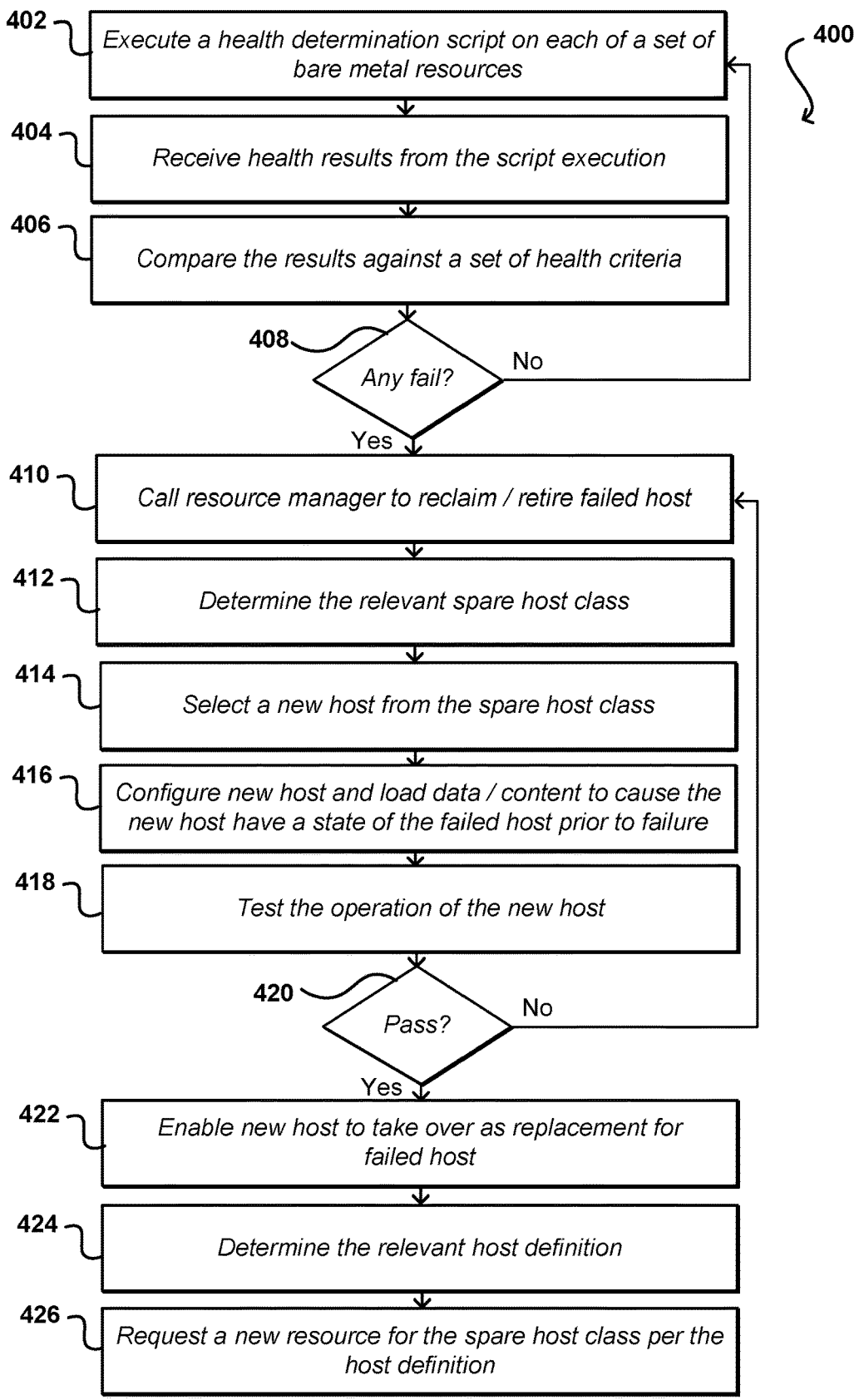
FIG. 4 illustrates an example process for executing a host recovery workflow that can be utilized in accordance with various embodiments.

FIG. 4 illustrates an example process 400 for executing a host replacement workflow that can be utilized in accordance with various embodiments. In this example, a health determination script is executed 402 on each of a set of bare metal resources. As mentioned, in other embodiments a health check can be performed without execution of such a script as discussed elsewhere herein. One or more health results can be received 404 in response to the script execution. These can include, for example, operational state values, capacity values, time stamps, or other information indicative of host health. The results can then be compared against a set of health criteria for the hosts. If it is determined 408 that all the hosts passed the health check then the hosts can continue their operation.

If, however, any of the host resources fail the health check then a host recovery workflow can be initiated. As part of the workflow, a resource manager or other such component or service can be called 410 to reclaim or retire the failed host. This can include, for example, attempting to reconfigure the resource for another purpose, and if the host is unable to be properly reconfigured then removing the host from operation. The relevant spare host class can be determined 412, and a new host selected 414 from that spare host class. As mentioned, the hosts in the class can be determined and/or configured for the specific use of the allocation. The new host can be configured 416 for the allocation, if not already fully configured, and can have any data and/or content loaded to cause the new host to have a state the same as, or similar to, that of the failed host just prior to the failure. The operation of the new host can then be tested 418. If it is determined 420 that the operation failed the test, then another host can be selected. If the operation passes the test, then the new host can be enabled 422 to take over as a replacement for the failed host with respect to the allocation. A relevant host definition can be determined 424 for the allocation, and a new resource requested for the spare host class to replace the one configured as the new host. The new resource can be selected and/or configured per the host definition for the allocation. In at least some embodiments at least a minimum number of host resources is maintained in the spare host class for use in failure recovery.

Figure 5:
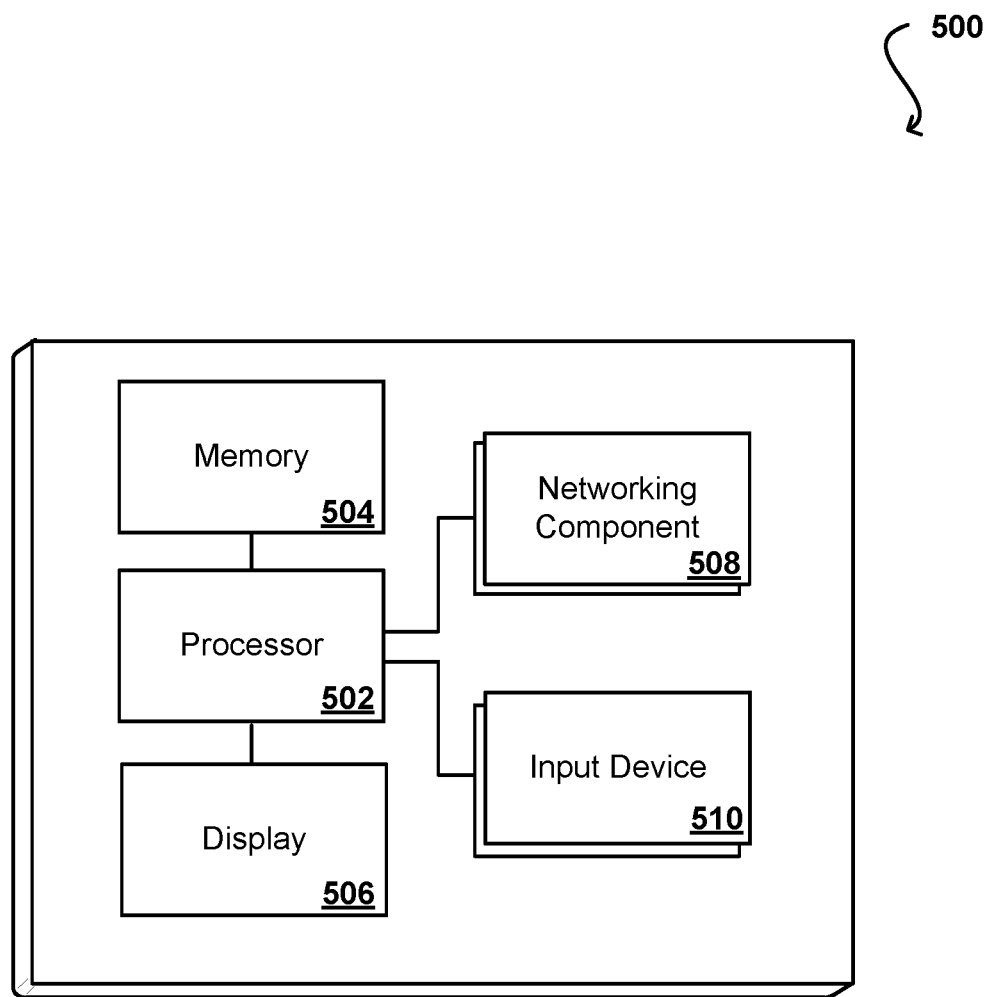
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
providing a multi-tenant environment comprising a plurality of host machines, the plurality of host machines comprising physical servers, wherein the multi-tenant environment is configured to allocate portions of individual ones of the physical servers to different tenants;
enabling the physical servers to be configured for single-tenant usage in the multi-tenant environment so that the physical servers are prevented from exposure to other than a dedicated tenant and so that the physical servers can be repurposed for usage in the multi-tenant environment;
monitoring the plurality of host machines according to multiple criteria;
determining that an operational state of an identified host machine, allocated for a specific task, satisfies a failure criterion;
identifying a spare host class corresponding to the specific task;
selecting, from the spare host class, a new host machine to replace the identified host machine;
configuring the new host machine to perform the specific task;
verifying the operational state of the new host machine; and
causing the new host machine to be allocated for performance of the specific task in place of the identified host machine.

2. The computer-implemented method of claim 1, further comprising:
determining the operational state of the identified host machine by executing a deep health script configured to determine various operational parameters for the identified host machine.

3. The computer-implemented method of claim 1, further comprising:
determining the operational state of the identified host machine by sending a set of ping requests to an identified process executing on the identified host machine.

4. The computer-implemented method of claim 1, further comprising:
automatically requesting an additional host machine to be allocated to the spare host class from a pool of hardware capacity.

5. The computer-implemented method of claim 1, further comprising:
initiating a host replacement workflow in response to determining that the operational state of the identified host machine satisfies the failure criterion, the host replacement workflow responsible for at least the selecting, configuring, and verifying of the new host machine.

6. A computer-implemented method, comprising:
providing a multi-tenant environment comprising a plurality of host machines, the plurality of host machines comprising physical servers, wherein the multi-tenant environment is configured to allocate portions of individual ones of the physical servers to different tenants;
detecting a failure of a host machine of the plurality of host machines, the host machine allocated for single-tenant usage in the multi-tenant environment, the single-tenant usage to prevent exposure, for a tenant other than a dedicated tenant, of at least one physical server that is associated with the host machine, the at least one physical server available to be repurposed for usage in the multi-tenant environment;
selecting, from a spare host class corresponding to the single-tenant usage, a new host machine to replace the failed host machine;
automatically configuring the new host machine for the single-tenant usage; and
causing the new host machine to be allocated in place of the failed host machine.

7. The computer-implemented method of claim 6, further comprising:
determining the failure using a failure definition provided by an entity for which the host machine is allocated.

8. The computer-implemented method of claim 6, further comprising:
executing a script on each of a set of host machines from the plurality of host machines allocated for the single-tenant usage;
comparing results of the executing against one or more host health criteria; and
detecting the failure based at least in part upon the results for the host machine failing at least one of the host health criteria.

9. The computer-implemented method of claim 6, further comprising:
sending a sequence of ping messages to the host machine; and
detecting the failure based at least in part upon failing to receive a timely response from the host machine for at least one of the ping messages.

10. The computer-implemented method of claim 6, further comprising:
requesting an additional host to be available as part of the spare host class, the additional host satisfying a host definition for the single-tenant usage.

11. The computer-implemented method of claim 6, further comprising:
verifying operation of the new host machine before causing the new host machine to be allocated in place of the failed host machine.

12. The computer-implemented method of claim 6, further comprising:

installing software and loading data on the new host machine to cause the new host machine to have a state similar to that of the failed host machine prior to the failure.

13. The computer-implemented method of claim 6, further comprising:
determining whether to repurpose or retire the failed host machine based at least in part upon a type of the failure.

14. A system, comprising
at least one processor; and
memory including instructions that, when executed by the at least one processor, cause the system to:
provide a multi-tenant environment comprising a plurality of host machines, the plurality of host machines comprising physical servers, wherein the multi-tenant environment is configured to allocate portions of individual ones of the physical servers to different tenants;
detect a failure of a host machine allocated for single-tenant usage in the multi-tenant environment, the single-tenant usage to prevent exposure, for a tenant other than a dedicated tenant, of at least one physical server that is associated with the host machine, the at least one physical server available to be repurposed for usage in the multi-tenant environment;
select, from a spare host class corresponding to the single-tenant usage, a new host machine to replace the failed host machine;
automatically configure the new host machine for the single-tenant usage; and
cause the new host machine to be allocated in place of the failed host machine.

15. The system of claim 14, wherein the instructions when executed further cause the system to:
execute a script on each of a set of host machines from the plurality of host machines allocated for the single-tenant usage;
compare results of the executing against one or more host health criteria; and
detect the failure based at least in part upon the results for the host machine failing at least one of the host health criteria.

16. The system of claim 14, wherein the instructions when executed further cause the system to:
verify operation of the new host machine before causing the new host machine to be allocated in place of the failed host machine.

17. The system of claim 14, wherein the instructions when executed further cause the system to:
determine the failure using a failure definition provided by an entity for which the host machine is allocated.

18. The system of claim 14, wherein the instructions when executed further cause the system to:
send a sequence of ping messages to the host machine; and
detect the failure based at least in part upon failing to receive a timely response from the host machine for at least one of the ping messages.

19. The system of claim 14, wherein the instructions when executed further cause the system to:
request an additional host to be available as part of the spare host class, the additional host satisfying a host definition for the single-tenant usage.

20. The system of claim 14, wherein the instructions when executed further cause the system to:
install software and loading data on the new host machine to cause the new host machine to have a state similar to that of the failed host machine prior to the failure.

* * * * *